US011118518B2

(12) United States Patent
Charbonnel

(10) Patent No.: US 11,118,518 B2
(45) Date of Patent: Sep. 14, 2021

(54) METHOD AND SYSTEM FOR AFTERTREATMENT CONTROL

(71) Applicant: Caterpillar Inc., Deerfield, IL (US)

(72) Inventor: Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/519,737

(22) Filed: Jul. 23, 2019

(65) Prior Publication Data
US 2021/0025342 A1 Jan. 28, 2021

(51) Int. Cl.
F02D 35/00 (2006.01)

(52) U.S. Cl.
CPC ..... *F02D 35/0015* (2013.01); *F02D 35/0023* (2013.01); *F02D 35/0046* (2013.01); *F02D 2200/0812* (2013.01)

(58) Field of Classification Search
CPC ............ F02D 35/0015; F02D 35/0023; F02D 35/0046; F02D 2200/0812; F01N 3/021; F01N 3/023; F01N 3/025; F01N 3/035; F01N 9/002; F01N 11/00
USPC .................................. 60/311, 274, 295, 297
See application file for complete search history.

(56) References Cited

U.S. PATENT DOCUMENTS

| 5,497,099 | A  | * | 3/1996  | Walton    | F01N 9/002 324/639 |
| 7,157,919 | B1 | * | 1/2007  | Walton    | F01N 9/002 324/639 |
| 7,231,291 | B2 | * | 6/2007  | Dollmeyer | F01N 9/002 701/114 |
| 7,848,871 | B2 | * | 12/2010 | Onishi    | F02D 41/402 701/104 |
| 7,930,922 | B2 | * | 4/2011  | Onishi    | F01N 9/002 73/23.31 |
| 8,069,658 | B2 | * | 12/2011 | He        | F01N 9/002 60/295 |
| 8,151,557 | B2 |   | 4/2012  | Gonze et al. | |
| 8,316,635 | B2 | * | 11/2012 | Zhang     | F01N 11/00 60/274 |
| 8,516,804 | B2 | * | 8/2013  | He        | F01N 9/002 60/311 |

(Continued)

FOREIGN PATENT DOCUMENTS

| CN | 108412588  | 8/2020 |
| WO | 2009099077 | 8/2009 |
| WO | 2019094180 | 5/2019 |

*Primary Examiner* — Thai Ba Trieu
(74) *Attorney, Agent, or Firm* — Bookoff McAndrews

(57) ABSTRACT

A method for controlling an internal combustion engine system including a particulate filter includes receiving a desired output for an internal combustion engine and receiving sensor information including information indicative of a quantity of soot in the particulate filter. The method includes calculating a plurality of sets of engine performance values based on respective sets of candidate control points, each set of engine performance values including a soot change rate at which the quantity of soot changes over time and determining whether the soot change rate satisfies a soot change rate limit that requires an increase in the quantity of soot in the particulate filter. The method also includes controlling the internal combustion engine based on a set of candidate control points that satisfies the soot change rate limit.

19 Claims, 2 Drawing Sheets

(56) References Cited

U.S. PATENT DOCUMENTS

| | | | |
|---|---|---|---|
| 8,523,988 B2* | 9/2013 | Jasinkiewicz | F01N 11/00 96/417 |
| 8,612,115 B2* | 12/2013 | George | F01N 3/0231 60/295 |
| 8,631,642 B2* | 1/2014 | Carlill | F01N 3/0235 60/311 |
| 8,776,501 B2 | 7/2014 | Carlill et al. | |
| 8,823,401 B2* | 9/2014 | Roth | G01N 15/0656 324/699 |
| 8,984,869 B2* | 3/2015 | Takayanagi | F01N 3/035 60/297 |
| 9,027,329 B2* | 5/2015 | Sun | F01N 3/023 60/274 |
| 9,032,719 B2* | 5/2015 | Sun, Jr. | F01N 3/021 60/311 |
| 9,051,889 B2* | 6/2015 | Swoish | F02D 41/029 |
| 9,097,150 B2* | 8/2015 | Schiavone | F02D 41/029 |
| 9,441,525 B2* | 9/2016 | Swoish | F02D 41/029 |
| 2004/0200198 A1* | 10/2004 | Inoue | F01N 3/023 55/282.3 |
| 2007/0056274 A1* | 3/2007 | Wills | F01N 3/0231 60/297 |
| 2007/0150162 A1 | 6/2007 | Hodjati | |
| 2008/0070776 A1* | 3/2008 | Yamaguchi | F01N 3/0222 502/100 |
| 2011/0146244 A1* | 6/2011 | Farman | F02D 41/029 60/285 |
| 2012/0159929 A1* | 6/2012 | Snopko | F01N 9/002 60/274 |
| 2012/0159930 A1* | 6/2012 | Snopko | F01N 9/002 60/274 |
| 2012/0216507 A1* | 8/2012 | Nieuwstadt | F01N 3/101 60/274 |
| 2012/0297751 A1 | 11/2012 | Sun | |
| 2013/0197778 A1* | 8/2013 | Rodriguez | F02D 41/1462 701/102 |
| 2014/0000239 A1* | 1/2014 | Swoish | F01N 9/002 60/274 |
| 2015/0088398 A1 | 3/2015 | Cui | |
| 2015/0233277 A1* | 8/2015 | Swoish | F01N 9/002 60/274 |
| 2017/0158194 A1* | 6/2017 | Leisenring | F01N 3/025 |
| 2017/0182447 A1* | 6/2017 | Sappok | F01N 3/021 |
| 2018/0016959 A1 | 1/2018 | Fujii | |
| 2018/0017012 A1* | 1/2018 | Suchta | F02D 41/029 |
| 2020/0095912 A1* | 3/2020 | Bouws | F01N 3/025 |
| 2020/0300190 A1* | 9/2020 | Diwakar Abraham | F02D 41/029 |
| 2020/0378284 A1* | 12/2020 | Hirozawa | F02D 41/0235 |

\* cited by examiner

METHOD AND SYSTEM FOR AFTERTREATMENT CONTROL

TECHNICAL FIELD

The present disclosure relates generally to internal combustion engines, and more particularly, to methods and systems for control of internal combustion engine systems having one or more exhaust aftertreatment devices.

BACKGROUND

Internal combustion engines are used in various vehicles, mobile machines, and stationary machines to perform work or generate power by the combustion of a fuel, such as diesel fuel. The combustion of diesel fuel produces pollutants, such as particulate matter (e.g., soot). While emissions performance has improved significantly since the introduction of the first internal combustion engines, it is desirable to further reduce the emission of substances such as particulate matter. Aftertreatment devices, such as particulate filters, may be used in combination with internal combustion engines to assist in reducing soot emissions.

Under certain conditions, the ability of the particulate filter to remove soot from exhaust may decline or become impaired. One such condition is the presence of excess soot in the particulate filter, which results in overloading of the filter. The amount of soot in a particulate filter may be controlled by taking remedial measures once overloading occurs. Methods for addressing overloading of the filter typically include determining when the amount of soot in the particulate filter exceeds a predetermined threshold. Once this threshold has been exceeded, one or more strategies may be employed to reduce the amount of soot present in the particulate filter. One particular strategy for reducing soot in a filter includes initiating a regeneration process in which the temperature of exhaust gas entering the filter is increased, thereby increasing the temperature of the particulate filter by an amount sufficient to burn off some of the soot.

An exemplary exhaust system including a diesel particulate filter (DPF) is disclosed in U.S. Pat. No. 8,151,557 B2 ("the '557 patent") to Gonze et al. The system described in the '557 patent includes an electrical heater upstream of the DPF to heat exhaust during an initial period of a regeneration cycle for the DPF. An amount of exhaust gas recirculation may also be increased during the beginning of DPF regeneration. This regeneration cycle for the DPF is performed when the estimated loading of the DPF reaches a threshold level.

While the threshold level of DPF loading described in the '557 patent may be useful when an excessive amount of soot is present in the DPF, the use of thresholds to determine whether to perform regeneration may not be useful for controlling a quantity of soot in other situations.

The disclosed method and system may solve one or more of the problems set forth above and/or other problems in the art. The scope of the current disclosure, however, is defined by the attached claims, and not by the ability to solve any specific problem.

SUMMARY

In one aspect, a method for controlling an internal combustion engine system including a particulate filter may include receiving a desired output for an internal combustion engine and receiving sensor information including information indicative of a quantity of soot in the particulate filter. The method may include calculating a plurality of sets of engine performance values based on respective sets of candidate control points, each set of engine performance values including a soot change rate at which the quantity of soot changes over time and determining whether the soot change rate satisfies a soot change rate limit that requires an increase in the quantity of soot in the particulate filter. The method may also include controlling the internal combustion engine based on a set of candidate control points that satisfies the soot change rate limit.

In another aspect, a method for controlling an internal combustion engine system including a particulate filter may include receiving a desired output for an internal combustion engine and receiving sensor information including information indicative of a quantity of soot present in the particulate filter. The method may include calculating a plurality of sets of engine performance values based on respective sets of candidate control points, each set of engine performance values including a soot change rate at which the quantity of soot changes over time and determining that at least one set of engine performance values satisfies a soot change rate limit. The method may also include updating a control map with the candidate control points associated with the at least one set of engine performance values.

In another aspect, a control system for an internal combustion engine system may include a particulate filter configured to receive soot-containing exhaust, a sensor configured to produce a signal indicative of an amount of soot in the particulate filter, and a controller. The controller may be configured to receive the signal from the sensor, determine that the particulate filter is in a low soot state based on the signal, and set a soot change limit based on the determination that the particulate filter is in the low soot state, the soot change limit requiring an increase in the amount of soot in the particulate filter. The controller may also be configured to operate at least one component of the internal combustion engine system based on the soot change limit by selecting a set of engine parameters that satisfies the soot change limit.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
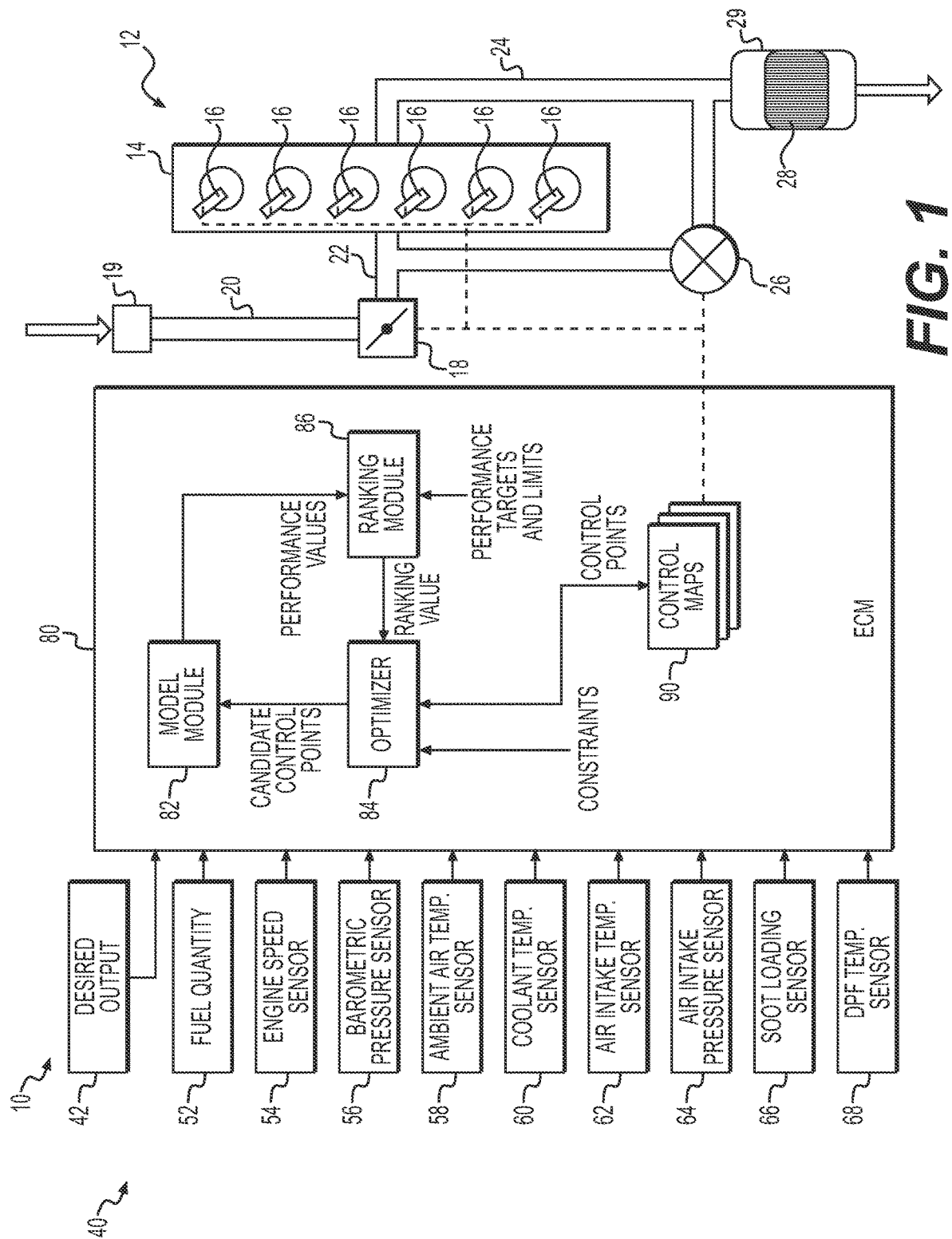
FIG. 1 is a schematic diagram illustrating a control system according to an aspect of the present disclosure.

FIG. 1 illustrates components of a control system 10 to assist in controlling soot emitted during the operation of an internal combustion engine system 12. Control system 10 may include a plurality of inputs 40 associated with internal combustion engine system 12, an electronic control module or ECM 80, and an internal combustion engine 14. Inputs 40 may include operator-generated inputs or requests and outputs from a plurality of sensors that measure the states of various aspects of engine system 12. ECM 80 may be provided as a single engine control module for controlling each component of the internal combustion engine system 12, may be distributed across multiple control units, or may be in communication with one or more additional control units. For example, ECM 80 may be in communication with one or more control units for controlling various subsystems of engine system 12. Engine system 12 may generate power by the combustion of fuel (i.e., diesel fuel) and may include an air intake system, an exhaust gas recirculation (EGR) system, and an aftertreatment system including one or more aftertreatment devices. Internal combustion engine system 12 may be capable of operating on one or more fuels (e.g., diesel fuel, gasoline, and/or gaseous fuel such as natural gas).

Internal combustion engine 14 may include a plurality of combustion chambers formed by a respective plurality of engine cylinders. Each cylinder may receive fuel, for example, via an electronically-controlled fuel injector 16. Fuel injectors 16 may be located in each cylinder for direct injection and/or in an intake port for port injection. An intake passage 20 may be connected upstream of engine 14 to provide air to each of the cylinders. Intake passage 20 may be provided downstream of one or more air compressors 19 and may include an intake throttle valve 18 and a downstream air intake passage 22 such as an engine intake manifold for the engine cylinders. The downstream intake passage 22 may be connected to intake valves (not shown) of each cylinder of internal combustion engine 14. An exhaust passage 24 may be connected downstream of engine 14 to provide a path for exhaust to exit each cylinder. The exhaust passage 24 may be included as part of an EGR system that includes an electronically-controlled EGR valve 26. An aftertreatment system may include one or more aftertreatment devices such as a diesel particulate filter (DPF) 28. Additional aftertreatment devices, such as a diesel oxidation catalyst and/or a selective catalytic reduction catalyst, may be included upstream and/or downstream of DPF 28. One or more devices to assist in regeneration of one or more aftertreatment devices may also be provided.

Inputs 40 may be formed by one or more sensors that output signals to ECM 80. As noted above, inputs 40 may include operator-generated inputs or "desired" inputs to ECM 80, such as desired output 42 of engine 14, as well as "actual" inputs from sensors configured to provide feedback information (e.g., inputs 52-68) corresponding to an actual condition of engine system 12. One or more inputs 40 may be associated with a measured or sensed state of one of the components of engine system 12, such as a state of fuel injector 16, air intake throttle valve (ITV) 18, or DPF 28.

Desired output 42 may be, for example, a desired production for engine 14 determined based on a measured position of an input device such as a pedal, lever, throttle, etc., or may correspond to a desired action of engine 14. For example, desired output 42 may correspond to a requested amount of torque, or a requested amount of power (e.g., when engine 14 is employed as a component of a generator) that is received as an input to ECM 80. A fuel quantity input 52 may correspond to an actual quantity or mass of injected fuel. Fuel quantity 52 may be formed by one or more flow and/or pressure sensors, for example, attached to one or more fuel lines and/or injectors 16. Engine speed sensor 54 may output a signal that corresponds to a rotational speed of engine 14 (e.g., by measuring rotations per minute of a crankshaft of engine 14). Barometric pressure sensor 56 may measure the pressure of air outside of engine 14. Ambient air temperature sensor 58 may measure a temperature of the air outside of engine 14. Coolant temperature sensor 60 may measure the temperature of coolant employed to maintain engine 14 at a desired temperature. Air intake temperature sensor 62 may measure a temperature of compressed air provided to engine 14, and may be provided within a portion of the air intake system of engine 14 (e.g., within downstream intake passage 22). Air intake pressure sensor 64 may measure a pressure of compressed air, e.g., downstream of ITV 18 and EGR valve 26, that is provided to each cylinder of engine 14. Signal lines associated with inputs 40 from internal combustion engine system 12 have been omitted for clarity.

One or more of the inputs 40 may be associated with an aftertreatment device such as DPF 28. For example, soot loading sensor 66 may produce a signal indicative of a quantity of soot present within DPF 28. Soot loading sensor 66 may include a differential pressure sensor (not shown), for example, that may output a signal indicative of the quantity of soot in DPF 28 based on a difference between a pressure at an inlet of DPF 28 and an outlet of DPF 28. Soot loading sensor 66 may alternatively or additionally include a radiofrequency sensor (not shown) configured to output a signal indicative of a quantity of soot in DPF 28 based on a change in frequency response detected by a pair of antennas (not shown). In addition to soot loading sensor 66, a DPF temperature sensor 68 may be provided to output a signal indicative of a temperature of DPF 28. DPF temperature sensor 68 may be provided at one or more locations upstream of DPF 28, downstream of DPF 28, on a canister (29) for securing DPF 28, or at any position on DPF 28 where a suitable temperature measurement corresponding to a temperature of DPF may be taken. Inputs 40 may additionally include an exhaust temperature sensor (not shown) that measures a temperature of exhaust in exhaust passage 24, for example, a temperature of exhaust adjacent an inlet to DPF 28.

ECM 80 may be configured to receive each of the inputs 40 and to output control signals to a plurality of electronically-controllable components of engine system 12, either directly or by one or more intermediate controllers. ECM 80 may embody a single microprocessor or multiple microprocessors that receive inputs 40 and issue control signals. ECM 80 may include a memory, a secondary storage device, a processor, such as a central processing unit or any other means for accomplishing a task consistent with the present disclosure. The memory or secondary storage device associated with ECM 80 may store data and software to allow ECM 80 to perform its functions. In particular, such data and software in memory or secondary storage device(s) may allow ECM 80 to perform the functions of a model module 82, an optimizer module or optimizer 84, and a ranking module 86. The memory may store a plurality of updateable control maps 90. Further, the memory or secondary storage device associated with ECM 80 may store data received from one or more of the inputs 40 of control system 10. Numerous commercially available microprocessors can be configured to perform the functions of ECM 80. Various other known circuits may be associated with ECM 80, including signal-conditioning circuitry, communication circuitry, and other appropriate circuitry. Inputs 40 may include any additional inputs that provide feedback or other information to ECM 80.

The exemplary modules of ECM 80 shown in FIG. 1, namely model module 82, optimizer 84, and ranking module 86, may allow ECM 80 to perform various functions such as updating one or more control maps 90. As can be seen in FIG. 1, these modules may provide outputs to each other and to control maps 90.

Control maps 90 stored within ECM 80 may indicate a relationship between a control point (which may take the form of an output) and one or more inputs. The one or more control points of each control map 90 may correspond to commands output by ECM 80 to a controllable component of engine 12 (e.g., fuel injectors 16, ITV 18, and EGR valve 26). Exemplary control points may include start of fuel injection, a mass of fuel injection, requested EGR, and requested intake air pressure (or boost). Other exemplary control points may include: a timing of a main injection, a pilot injection, and/or post-main injection, a shot mode where a pilot and/or post-main injection is performed or omitted, and a number of deactivated cylinders in which fuel injectors 16 are deactivated. Additionally, control points may include a mass of injected fuel (during main injection, pilot injection, and/or post-main injection). Exemplary inputs of control maps 90 may include one or more sensed or actual conditions of engine system 12 (e.g., one or more of inputs 52-68) and/or a desired output (e.g., desired output 42). Control maps 90 may be provided as look-up tables or in any other suitable form.

Control maps 90 may be updateable within the memory of ECM 90, such that the relationship between one or more control points and one or more inputs to control maps 90 may change over time. For example, a control map 90 may be updated with a new or modified control point for one or more particular input(s) to the control map 90. For example, in an EGR control map 90, a particular value of an EGR control point may be updated for a certain set of inputs to the control map 90 (e.g., particular values of desired output 42, engine speed, and requested intake air pressure). While some of the control maps 90 may be updatable, others may be fixed (permanent or non-updateable). ECM 80 may output control signals or control commands to at least one of injectors 16, ITV 18, or EGR valve 26 based on control maps 90.

Optimizer module 84 may search for optimal sets of candidate control points by searching for candidate sets of control points and evaluating each set of control points based on a ranking value for each set of candidate control points. Optimizer module 84 may receive control points based on a search of control maps 90 as a first input. These control points may be received as one or more sets. Each set of control points may correspond to respective commands for one or more controllable features or actuators of engine system 12 (e.g., controllable actions of injectors 16, ITV 18, and EGR valve 26). Optimizer 84 may also receive one or more constraints stored in a memory of ECM 80. Constraints may correspond to hard restrictions that can never be exceeded when engine 14 is running. Optimizer 84 may output a plurality of candidate control points, as a set, to model module 82. Optimizer 84 may receive a ranking value associated with each of these sets of candidate control points following analysis of each set by model module 82 and ranking module 86. Finally, optimizer 84 may output one or more sets of candidate control points to update control maps 90.

Model module 82 may receive each set of candidate control points output by optimizer 84. Model module 82 may also receive one or more of the inputs 40, including desired output 42 and one or more sensed or actual values corresponding to inputs 52-68. Model module 82 may provide an empirical or physics-based model that corresponds to engine system 12. The engine model may allow model module 82 to calculate a plurality of performance values that corresponds to each set of candidate control points. Each performance value may be a calculated value corresponding to an expected performance of the engine, intake system, or emissions system. The plurality of performance values may form an output of model module 82.

Ranking module 86 may receive each plurality of performance values from model module 82. Ranking module 86 may also receive each set of candidate control points associated with the plurality of performance values. Ranking module 86 may retrieve, e.g., from a memory of ECM 80, a plurality of performance limits and performance targets. Based on these inputs, ranking module 86 may calculate or otherwise determine a ranking value associated with each set of control points, which may be output to optimizer 84.

INDUSTRIAL APPLICABILITY

The disclosed aspects of control system 10 may be employed in a variety of machines and/or vehicles. For example, control system 10 may be included in any mobile machine having an internal combustion engine that produces soot. Additionally, control system 10 may be employed in any stationary or large machine that includes an internal combustion engine that produces soot. Control system 10 may be configured to reduce particulate matter emissions of any suitable machine or vehicle.

During the operation of control system 10, engine 14 combusts fuel injected by fuel injectors 16. An amount of air entering each cylinder may be controlled by ITV 18. An amount of EGR may be controlled by a position of EGR valve 26. ECM 80 may continuously monitor the operating condition of components of engine system 12 via inputs 40. ECM 80 may update control maps 90 during the operation of engine system 12 based on the operations of model module 82, optimizer 84, and ranking module 86, and may control one or more of the fuel injectors 16, ITV 18, and EGR valve 26, based on the updated control maps 90. In one aspect, fuel injectors 16, ITV 18, and EGR valve 26 may be controlled, based on updated control maps 90, to reach and maintain a desired quantity of soot in DPF 28.

As noted above, sets of control points may be identified by optimizer 84 during the operation of control system 10, and may be used to update one or more control maps 90. Model module 82 may provide an empirical or physics-based model that estimates the operation of engine system 12 based on known relationships for system 12. Additionally, ranking module 86 may calculate or otherwise determine a ranking value associated with each set of control points based on performance values output by model module 82.

Optimizer 84 may identify sets of candidate control points by a random selection process, or based on existing information stored in control maps 90. For example, candidate control points may be selected based on control maps for a timing of the start of fuel injection, fuel mass, requested EGR and/or requested intake air pressure. Each control map may define a hypersurface that corresponds to a plurality of potential control points that may satisfy the inputs to the control map (e.g., current engine speed and desired torque).

In one aspect, each set of candidate control points may be identified randomly from control points that satisfy the engine speed and requested torque. However, non-random identification strategies, such as an iterative search, may be employed. Non-random identification strategies may search for sets of candidate control points based on previously-evaluated sets of candidate control points that were determined to be satisfactory (e.g., by satisfying each performance limit). For example, once a satisfactory set of candidate control points is identified, a subsequent search may begin by identifying neighboring control points.

Exemplary control points for injectors 16 may include the start of fuel injection (such as a timing of a main injection, a pilot injection, and/or post-main injection, a shot mode where a pilot and/or post-main injection is performed or omitted, or a number of deactivated cylinders in which fuel injectors 16 are deactivated) and mass of injected fuel (during main injection, pilot injection, and/or post-main injection). Control points for ITV 18 and EGR valve 26 may include the positions (e.g., opening degree) of these valves, and may provide control over amount of EGR, intake manifold pressure, air intake temperature, and other performance values. The search for sets of candidate control points by optimizer 84 may be limited based on boundaries, such as one or more of the above-described constraints, which may be permanently stored in a memory of ECM 80. Moreover, the optimizer 84 may search for each control point based on respective lower and upper boundaries (e.g., minimum and maximum values) associated with each control point. These boundaries may be derived from an engine tune or map stored in the memory of ECM 80. These boundaries may be calculated, for example, based on one or more stored equations (e.g., a lower boundary for a particular control point may correspond to 20% of an expected value for the control point). Exemplary constraints may include minimum and/or maximum values for: fuel injection mass, injection timing, EGR, or intake air pressure. Additionally, one or more constraints (e.g., constraints associated with shot mode, air intake temperature, number of deactivated cylinders, etc.) may apply based on a type of search performed by the optimizer.

Once model module 82 receives one or more sets of candidate control points from optimizer 84, these candidate control points and one or more of inputs 40 may be used as inputs in the engine model. In an exemplary configuration, the engine model may allow model module 82 to calculate a real-time performance of engine system 12. This engine model may describe a plurality of physical relationships between the inputs to the engine model (candidate control points and at least one input 40) and a plurality of performance values that are output from the engine model. Thus, by inputting the plurality of candidate control points and one or more inputs 40 to the model, model module 82 may calculate a plurality of performance values that correspond to the candidate control points and to the actual conditions of engine system 12.

One exemplary engine performance value calculated by model module 82 is a soot change rate that corresponds to a rate at which the quantity of soot in DPF 28 is expected to change over time. This soot change rate, or DPF fill rate, may represent a rate at which the quantity of soot increases in DPF 28, decreases in DPF 28, or an indication that soot will remain constant or substantially constant in DPF 28. The DPF fill rate performance value may be calculated based on the amount of soot produced by engine 14 (soot production rate) for the set of candidate control points, and the temperature of the DPF 28 indicated by DPF temperature sensor 28. The soot change rate may be calculated based on known or experimentally-confirmed relationships between engine 14 and DPF 28. In general, a low level of soot production and high DPF temperature may tend to reduce soot in DPF 28, while a high soot production and low DPF temperature may tend to cause positive soot accumulation.

Exemplary engine performance values may also include one or more of fuel consumption, transient response, output torque, brake mean effective pressure, or quantity of intake air flow. Further engine performance values may include mass airflow, exhaust manifold temperature, peak cylinder pressure, NOx quantity (before and/or following aftertreatment), the soot production rate (a rate of production of soot by engine 14 before and/or following aftertreatment), NOx/soot ratio (before and/or following aftertreatment), or others. Once each performance value is calculated for the sets of candidate control points, the performance values may be output from model module 82 to ranking module 86.

Ranking module 86 may be configured to perform two or more functions to evaluate the performance values for each set of candidate control points. First, ranking module 86 may determine whether the performance values of the candidate control points satisfy one or more performance limits, such as a soot accumulation limit or DPF fill rate limit. As a second function, ranking module 86 may calculate a ranking value associated with each set of candidate control points by comparing one or more performance values to a corresponding performance target.

Performance limits may be fixed (permanent), or may be adjusted by ranking module 86 during operation of internal combustion engine system 12. For example, ranking module 86 may be configured to change one or more of the performance limits based on a sensed or calculated condition of one or more components of internal combustion engine system 12. For example, a plurality of performance limits may be stored in memory of ECM 80. Ranking module 86 may select the appropriate performance limit based on a measured or calculated state of engine 14. One exemplary settable or changeable limit is the DPF fill rate limit. Engine performance targets may be changed in a similar manner, if desired.

The DPF fill rate limit may be set to restrict allowable DPF fill rates. The DPF fill rate may represent an accumulation or removal rate of soot in DPF 28 for a particular set of candidate control points. The DPF fill rate may be positive when soot will accumulate in DPF 28 for a set of candidate control points. Conversely, a negative DPF fill rate may be indicative of removal of soot over time. A zero or near-zero DPF fill rate may indicate that soot will remain substantially constant in DPF 28.

Ranking module 86 may determine the actual soot loading state of DPF 28 (via soot loading sensor 66) and change the DPF fill rate limit depending on this state. In an exemplary configuration, the soot loading state of DPF 28 may transition between three potential soot loading states: a low soot loading state in which DPF 28 is underloaded, a preferred (moderate) soot loading state in which a filtering performance of DPF 28 is optimal, and a high soot loading state in which DPF 28 is overloaded and has collected too much soot and/or may benefit from regeneration. In an exemplary embodiment, a soot quantity of 0.5 g/l (or less) may be associated with the underloaded or low soot loading state, a soot quantity of 3 g/l may be associated with the preferred soot loading state, and a soot quantity of 8 g/l (or more) may be associated with the overloaded or high soot loading state.

Ranking module 86 may change the DPF fill rate limit in response to changes in the soot loading state. For example, the DPF fill rate limit may require a positive value (soot accumulation over time) for the low soot loading state, and require a negative value (soot removal over time) for the high soot loading state. More than three soot loading states, with a respective plurality of limits, may be provided. The DPF fill rate limit for each soot loading state may be provided as a single value or as a range of values. For example, the preferred soot loading state may be associated with a DPF fill rate limit provided as a range that allows for some soot accumulation or some soot removal. The DPF fill rate limit for the low soot loading state may include a single value or a range of positive values, which may include a minimum required soot change rate and a maximum allowed soot change rate (e.g., a range of values that are greater than zero). The DPF fill rate limit for the high soot loading state may similarly be provided as a single (negative) value or a range of (negative) values.

Regarding the second function of ranking module 86, this module may calculate a ranking value for each set of candidate control points. The ranking value may be calculated by evaluating each set of performance values with respect to corresponding performance targets. For example, ranking module 86 may compare a fuel consumption performance value calculated by model module 82 to a fuel consumption target. Ranking module 86 may determine a magnitude of the difference between the performance value and target. Additionally, each performance target may be associated with a weighting factor. One or more weighting factors may be permanent or fixed values stored in ECM 80, while other weighting factors may be user-editable (e.g., within pre-defined boundaries). Weighting factors may correspond to a relative importance of each performance target.

Ranking module 86 may calculate the ranking value based on the comparison of each performance value with the corresponding performance target and each associated weighting factor. The ranking value may be provided as a single value for a set of candidate control points (and the associated performance values). In an exemplary configuration, the ranking value may be calculated with a cost function. Thus, a cost may be calculated for a plurality of performance values based on the deviation from the performance target. The ranking value may represent a sum of these costs, taking into account the relevant weighting factors for each cost. When the ranking value is determined on the basis of a cost function, a preferable (desired) ranking value may correspond to a lower ranking value. However, the ranking value may alternatively represent a desirability score, in which a higher value may represent a preferable ranking value. Each set of candidate control points may be provided, with the associated ranking value, to optimizer 84, which compares the respective ranking values. Maps 90 may be updated when a set of candidate control points is determined to satisfy each limit and is found to have a preferable ranking value as compared to one or more other sets of candidate control points.

Figure 2:
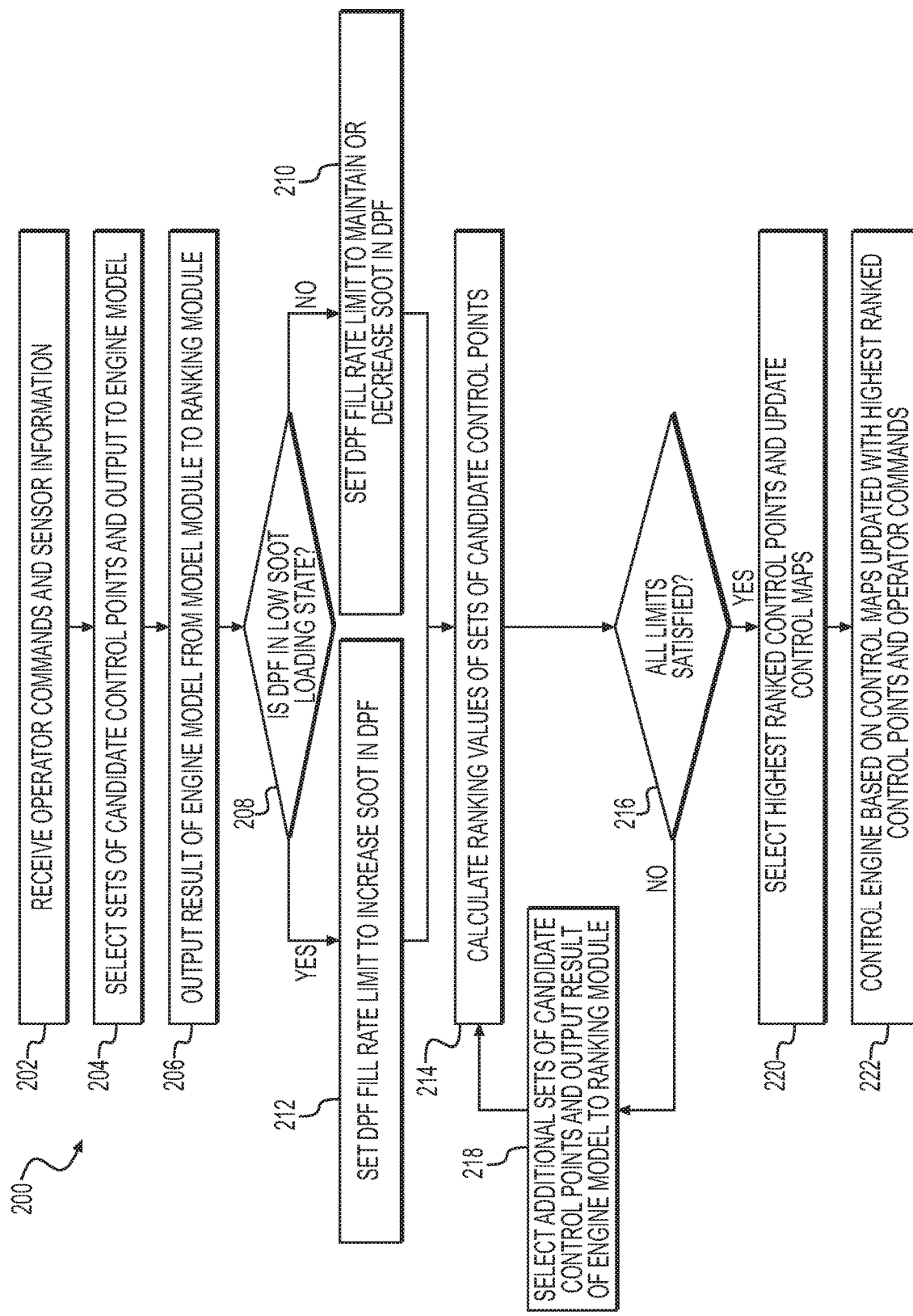
FIG. 2 is a flowchart illustrating a method according to the control system of FIG. 1.

FIG. 2 illustrates a control method 200 that may be performed with exemplary control system 10. In a step 202 of method 200, ECM 80 may receive an operator command, such as desired output 42 associated with a request for a particular output from internal combustion engine 14. A desired output 42 may take the form of a requested torque to be produced by internal combustion engine 14, a requested power to be produced by internal combustion engine 14, etc. For example, desired output 42 may correspond to an operator command issued by an input device, as described above. Step 202 may also include receiving each item of information from the sensors of engine system 12, e.g., by inputs 40, including a signal indicative of an amount of soot in the particulate filter from sensor 66. Step 202 may be performed at regular intervals during method 200 and during the operation of engine 14. For example, step 202 may be performed at approximately 60 millisecond (ms) intervals, 120 ms intervals, or any other appropriate interval.

In step 204, optimizer 84 may select (e.g., randomly or by searching control maps 90) a plurality of sets of candidate control points. In an exemplary configuration, 1,000 sets of candidate control points may be selected in step 204. The selected sets of candidate control points may be output from optimizer 84 to model module 82.

In step 206, based on these sets of candidate control points, model module 82 may calculate corresponding sets (e.g., 1,000 sets) of performance values. The performance values may be determined from an output of the engine model corresponding to engine system 12. Each set of performance values may be output to ranking module 86. For example, a DPF fill rate may be calculated by determining, via the engine model, the quantity of soot expected to be produced by engine 14, and the quantity of soot (if any) expected to be burned off due to the temperature of DPF 28 and the expected change in the temperature of DPF 28.

Steps 208, 210, and 212 provide an exemplary process for setting or changing one of the performance limits based on a condition of engine system 12. One exemplary condition may be the quantity of soot in DPF 28. Thus, step 208 may include determining the soot loading state of DPF 28 based on sensor information indicative of the quantity of soot present in DPF 28 (e.g., as output from sensor 66). For example, step 208 may include determining whether DPF 28 is in the low soot loading state when a quantity of soot is determined to be lower than a predetermined threshold.

When DPF 28 is not in a low soot loading state, step 210 may be performed. In step 210, a DPF fill rate limit may be set based on the amount of soot in DPF 28. Thus, step 210 may also include determining whether the DPF 28 is in the preferred soot loading state or the high soot loading state, and setting the DPF fill rate performance limit accordingly. Step 210 may be performed when the soot loading state of DPF 28 changes over time.

When DPF 28 is in the low soot loading state, step 212 may be performed. In step 212, the DPF fill rate is set to require an increase in the soot loading in DPF 28. The DPF fill rate may be set as a single limit or single value (i.e., requiring a soot loading rate greater than zero) or may be set as a range of values that require soot accumulation, as described above.

Step 214 may follow either step 210 or step 212 and may include calculating a ranking value associated with each of the sets of candidate control points. Step 214 may be performed by comparing performance values for each of the sets of candidate control points to one or more respective performance targets. Thus, step 214 may calculate a plurality of ranking values, each ranking value corresponding to one set of candidate control points selected in step 204. Therefore, in an exemplary configuration where 1,000 sets of candidate control points were selected in step 204 and evaluated with the engine model in step 206, 1,000 corresponding ranking values may be calculated.

In step 216, the performance values for each set of candidate control points may be compared to each of the performance limits, including the DPF fill rate limit set in step 210 or step 212. For example, optimizer 84 may identify which sets of candidate control points satisfy each of the limits, including the DPF fill rate limit.

In step 218, when none of the sets of candidate control points satisfy these limits, the set of candidate control points having the most preferable ranking value may be stored in a memory of ECM 80. Thereafter, additional sets of candidate control points (e.g., 1,000 new sets of candidate control points) may be selected by optimizer 84 and output to model module 82. Step 218 may also include evaluating each additional set of candidate control points with the engine model, and outputting the results (performance values) to ranking module 86. Step 218 may be performed in a manner similar to steps 204 and 206. Following step 218, method 200 may return to step 216 to determine whether one or more of the additional sets of candidate control points satisfies each of the limits. Steps 214-218 may be repeated until at least one set of candidate control points that satisfies each limit is identified. If, after a predetermined time period, a set of candidate control points that satisfies all limits is not identified, ECM 80 may operate engine system 12 based on a previously-identified set of candidate control points (e.g., stored in maps 90), or based on the set of candidate control points with the most preferable ranking value. The process may then return to step 202 and updated operator commands and sensor information may be received.

In step 220, optimizer 84 may select the highest ranked set of control points from the sets of control points that satisfy all of the limits, including the DPF fill rate limit. Once the most preferable set of control points is selected, one or more control maps 90 may be updated based on the set of control points with the most preferable ranking.

In step 222, at least one component of engine system 12 may be operated based on a desired output 42 and the control map(s) that were updated in step 220, for example, to increase the quantity of soot in DPF 28. Thus, each limit, including the DPF fill rate limit, may be satisfied during the operation of engine system 14.

As method 200 may be performed throughout the operation of engine system 12, steps 202, 204, 206, 208, 210, 212, 214, 216, 218, 220, and 222 may be performed repeatedly. Thus, the soot loading state of DPF 28 may be regularly or continuously monitored, and the DPF fill rate limit may be changed accordingly. While method 200 may be performed by evaluating a plurality of candidate control points over a predetermined period of time (e.g., 1,000 control points or more in a 60 ms period of time), method 200 may include selecting sets of candidate control points (step 204), outputting the result of the engine model to ranking module 86 (step 206), and calculating a ranking value (step 214) for individual sets of candidate control points. The evaluation of individual sets of candidate control points may continue until a similar plurality of control points (e.g., 1,000 control points) are evaluated over a predetermined period of time, such as 60 ms, 120 ms, etc.

Control system 10 and method 200 may achieve improved performance while improving filtration efficiency of the diesel particulate filter. The use of a threshold level for regeneration may not assist when a DPF is in an underloaded condition, where filtering performance may be inadequate. Unlike a statically-calibrated engine and particulate filter, the present system 10 and method 200 may be able to determine an appropriate amount of soot that should be produced by the engine. The control system 10 and method 200 may allow ECM 80 to calculate a rate at which a DPF 28 may fill with soot to correct an underloaded condition. Counterintuitively, the presence of an small amount of soot in the particulate filter, or underloading, may reduce the performance of the filter. This issue can be exacerbated when the engine operates in a high-temperature condition for an extended period of time, as high temperatures may prevent the accumulation of soot in the filter or even partially regenerate the filter. Thus, the ability to respond to an underloaded filter may reduce unwanted emissions.

Additionally, the empirical or physics-based model programmed in the ECM 80 may allow the ECM 80 to control internal combustion engine 14 dynamically, based on the amount of soot necessary to maintain DPF 28 in an optimal filtering condition, thereby optimizing the operation of engine 14. Thus, the system 10 and method 200 may provide a more precise method for controlling an amount of soot in DPF 28. Additionally, by providing updatable control maps, the system 10 and method may identify new sets of control points that satisfy the required soot accumulation rate for DPF 28 and various performance requirements for the internal combustion engine. Optimal control points may be identified when the performance of the engine or the operating environment of the engine changes over time, providing a more accurate and responsive control system as compared to systems that rely entirely upon control maps, for example.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method for controlling an internal combustion engine system including a particulate filter during operation of the internal combustion engine system, the method comprising:
   receiving, with an electronic control module, a request for a power output from an internal combustion engine;
   receiving, with the electronic control module, information via at least one sensor, including information indicating a quantity of soot in the particulate filter;
   calculating, with the electronic control module, a plurality of sets of engine performance values based on respective sets of candidate control points, each of the plurality of sets of the engine performance values including a soot change rate at which the quantity of soot changes over time;
   determining, with the electronic control module, whether the soot change rate satisfies a soot change rate limit to require an increase in the quantity of soot in the particulate filter, wherein the soot change rate limit corresponds to a rate at which a quantity of soot in the particulate filter is expected to change over time; and
   controlling, with the electronic control module, a fuel injector to adjust an injected fuel mass during at least one of a main injection, a pilot injection, or a post-main injection for the internal combustion engine based on one or more of the respective sets of candidate control points that satisfy the soot change rate limit to achieve the required increase in the quantity of soot in the particulate filter.

2. The method according to claim 1, wherein the soot change rate limit is set based on the quantity of soot indicated in the sensor information.

3. The method according to claim 2, wherein the soot change rate limit is provided as a range of soot change rates including a minimum required soot change rate and a maximum allowed soot change rate.

4. The method according to claim 1, further including determining, with the electronic control module, whether the engine performance values satisfy a plurality of performance limits that includes the soot change rate limit.

5. The method according to claim 4, further including updating, with the electronic control module, a control map based on candidate control points that satisfy the plurality of performance limits.

6. The method according to claim 1, wherein the soot change rate is determined based on at least an amount of soot to be produced by the internal combustion engine and a temperature of the particulate filter.

7. The method according to claim 1, wherein the request for power output corresponds to a requested torque.

8. The method according to claim 1, wherein the set of candidate control points includes control points for one or more of start of fuel injection, exhaust gas recirculation amount, or intake air pressure.

9. The method according to claim 1, wherein the engine performance values include one or more of a fuel consumption, a transient response, an output torque, a brake mean effective pressure, or a quantity of intake air flow.

10. A method for controlling an internal combustion engine system including a particulate filter during operation of the internal combustion engine system, the method comprising:
receiving, with an electronic control module, a request for a power output from an internal combustion engine;
receiving, with the electronic control module, information via at least one sensor, including information indicating a quantity of soot present in the particulate filter;
calculating, with the electronic control module, a plurality of sets of engine performance values based on respective sets of candidate control points including candidate control points for controlling a fuel injector to adjust an injected fuel mass during at least one of a main injection, a pilot injection, or a post-main injection, each of the plurality of sets of the engine performance values including a soot change rate at which the quantity of soot changes over time;
determining, with the electronic control module, that at least one set of engine performance values satisfies a soot change rate limit to require an increase in the quantity of soot in the particulate filter, wherein the soot change rate limit corresponds to a rate at which a quantity of soot in the particulate filter is expected to change over time; and
updating, with an optimizer module of the electronic control module, a control map stored within a memory associated with the electronic control module with the candidate control points associated with the at least one set of engine performance values.

11. The method according to claim 10, further including setting, with the electronic control module, the soot change rate limit to increase the quantity of soot in the particulate filter when the sensor information indicates that the quantity of soot corresponds to a low soot loading state of the particulate filter.

12. The method according to claim 11, further including changing, with the electronic control module, the soot change rate limit based on a change in the quantity of soot indicated by the sensor information.

13. A control system for an internal combustion engine system, comprising:
a particulate filter configured to receive soot-containing exhaust;
a sensor configured to produce a signal indicating an amount of soot in the particulate filter; and
a controller including a storage device storing data that allow the controller to:
receive the signal from the sensor;
determine that the particulate filter is in a low soot state based on the signal;
set a soot change limit based on the particulate filter being in the low soot state to achieve an increase in the amount of soot in the particulate filter, wherein the soot change limit corresponds to a rate at which a quantity of soot in the particulate filter is expected to change over time; and
operate at least one component of the internal combustion engine system, including a timing of fuel injection with a fuel injector during at least one of a main injection, a pilot injection, or post-main injection, based on the soot change limit by selecting a set of engine parameters that satisfies the soot change limit.

14. The control system according to claim 13, wherein the at least one component of the internal combustion engine system further includes at least one of an EGR valve, an air compressor, or an air intake throttle valve.

15. The control system according to claim 13, wherein the low soot state is associated with an amount of soot of about 3.0 g/l of soot, or less, in the particulate filter.

16. The control system according to claim 13, wherein the storage device of the controller stores data that allow the controller to change the soot change limit based on the amount of soot indicated in the signal.

17. The control system according to claim 16, wherein the soot change limit is provided as a range of soot change rates including a minimum required soot change rate and a maximum allowed soot change rate.

18. The control system according to claim 13, wherein the storage device of the controller stores data that allow the controller to calculate a plurality of sets of engine performance values based on respective sets of candidate control points, each set of engine performance values including a soot change rate at which the amount of soot changes over time.

19. The control system according to claim 13, wherein the storage device of the controller stores data that allow the controller to determine whether a plurality of engine performance values satisfy a plurality of performance limits that includes the soot change limit.

* * * * *